Aug. 14, 1962
H. Z. GORA
3,048,894
MOLD FOR MOLDING ARTICLES
Filed Sept. 25, 1959
2 Sheets-Sheet 1
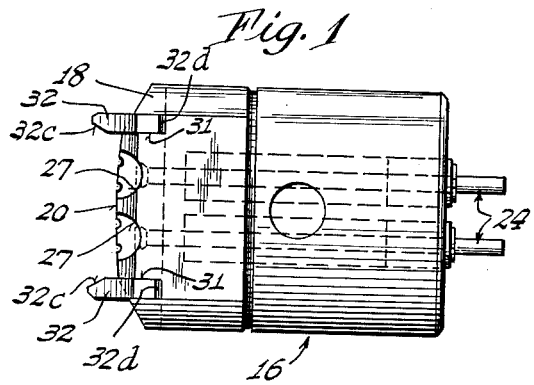
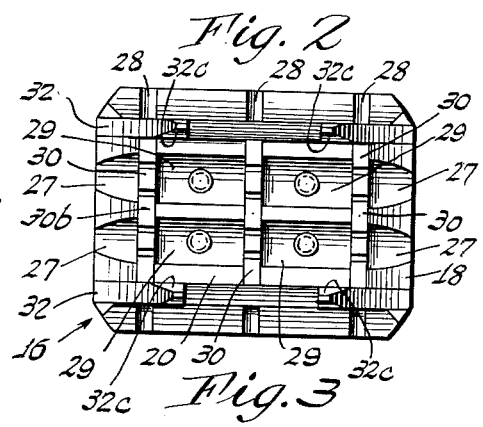
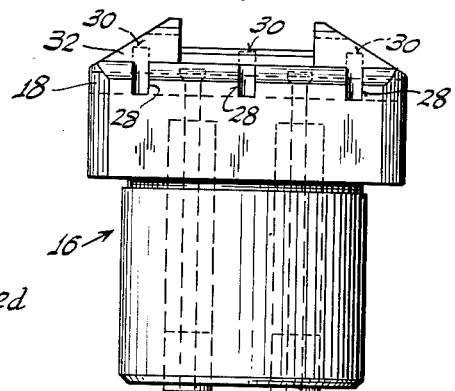
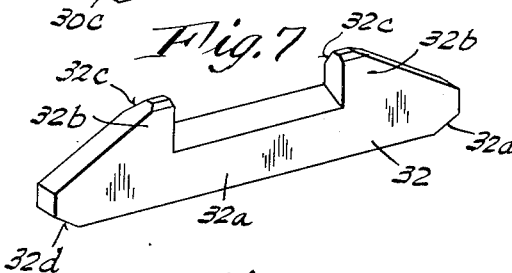
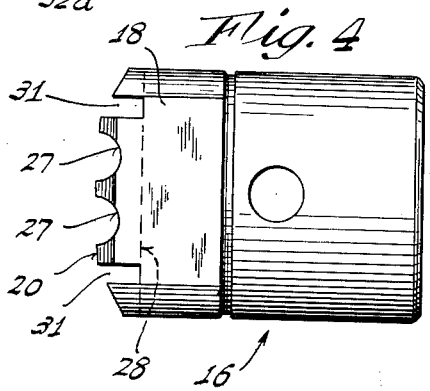
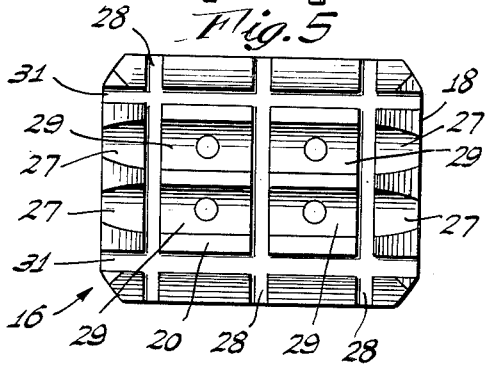
INVENTOR.
Henry Z. Gora
BY
Johnson and Kline
ATTORNEYS

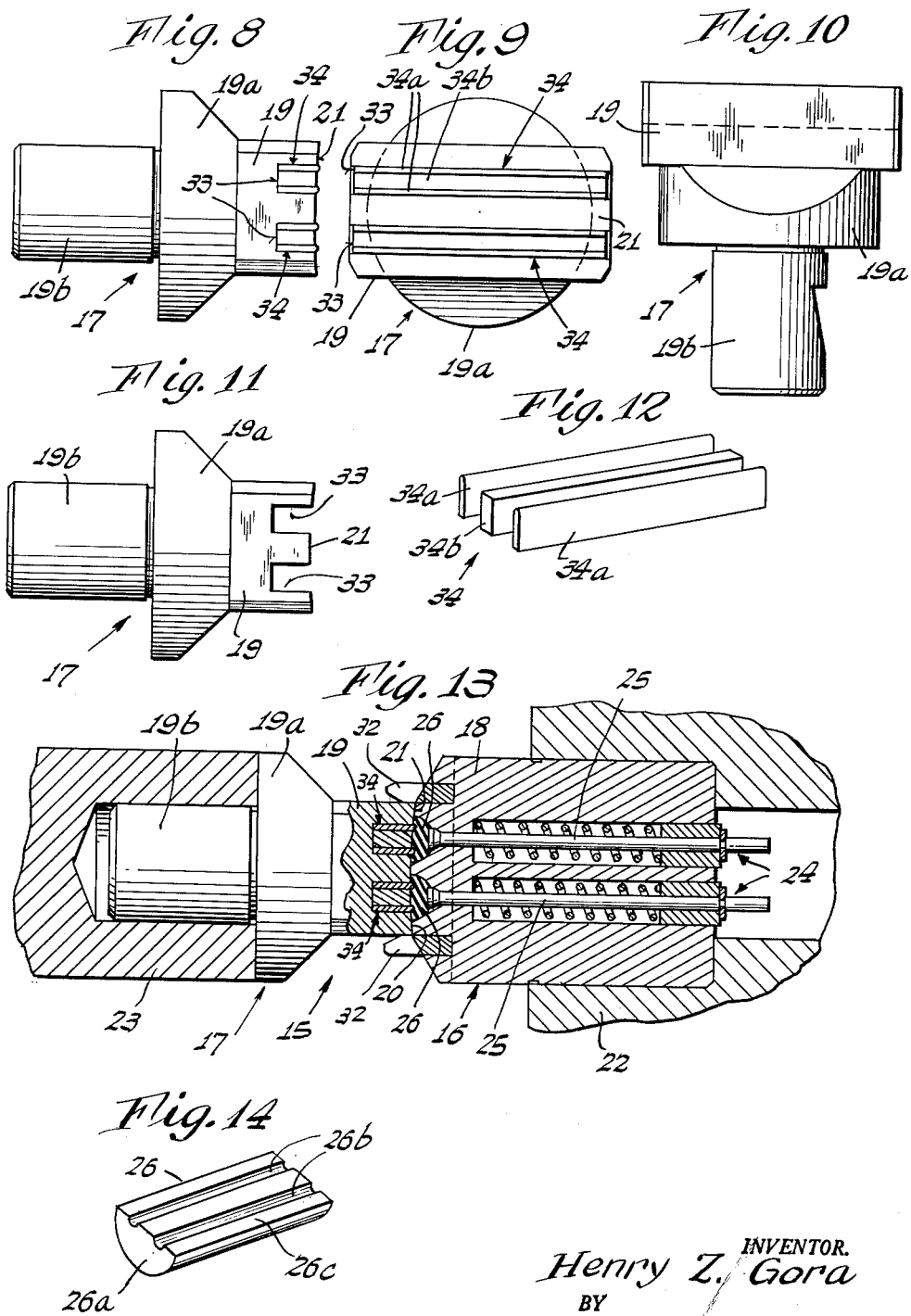

United States Patent Office 3,048,894
Patented Aug. 14, 1962

3,048,894
MOLD FOR MOLDING ARTICLES
Henry Z. Gora, Stratford, Conn., assignor to The Eagle-Picher Company, Cincinnati, Ohio, a corporation of Ohio
Filed Sept. 25, 1959, Ser. No. 842,453
8 Claims. (Cl. 18—36)

This invention relates to a mold or die for molding articles from plastic material. More specifically, it pertains to mating die members adapted to be moved between separated and molding position for molding articles having a critical outline and surface configuration.

An important object of the present invention is to provide such a mold wherein the mating die members are readily made at a minimum of expense by relatively simple machining operations.

Heretofore, the fabrication of mating die members has been time consuming and expensive, particularly where the article to be molded in the dies has a critical outline and surface configuration which is provided in great part by the contour of the molding cavity. Dies of the type above referred to require intricate machining and often must be hand finished to produce the desired results, thereby necessitating highly skilled labor in their production and greatly increasing their cost. Further, in accordance with modern production methods, where articles are mass produced at great speed, it is the practice to utilize multi-cavity dies wherever possible, thus complicating the task of fabricating the individual die members.

The present invention overcomes the problems aforenoted by providing a mold for molding articles wherein the individual die members are of such a character that they may be machined by conventional tools to provide a molding cavity having recesses for receiving removable elements which cooperate with the molding cavity to form an article-forming cavity adapted to produce the desired article of critical outline and surface configuration.

According to the invention, one of the die members of a mold for molding articles, which comprises a pair of relatively movable die members having opposed mating faces, is formed with a molding cavity extending completely across the die face and opening outwardly of the ends of the die member. This molding cavity is dissected by one or a plurality of recesses formed in the face of the die, which define at least one article-forming cavity, and preferably extend across the face of the die to open outwardly at the side edges thereof. The recesses, which are machined to provide flat, smooth walls, are adapted to slidably receive and frictionally and removably retain inserts that form the end walls of the article-forming cavities.

A feature of the invention resides in the structure of the die members which facilitates the individual fabrication of the separate elements of the article-forming cavity enabling them to be machined or similarly formed and finished as by grinding for instance, by conventional methods, to close and exacting tolerances.

Another feature of the invention relates to the adaptability of the molds to quantity production operations and to the reduction in "down time" of the molding apparatus for repair and replacement of worn or damaged die members. In accordance with the invention, and as a result of the removable frictional engagement of the inserts in the cavity defining recesses, elements of the article-forming cavity which are most subject to damage or wear may be readily removed for replacement when they are worn or broken and this can be accomplished, if desired, without removing the die member from the apparatus or resorting to the costly substitution of completely new die members.

In accordance with another form of the invention, the male die member or member that cooperates with the cavity forming member may be formed with recesses or slots in its die face for frictionally, removably receiving inserts adapted to cooperate with the article-forming cavity in the molding of the molded article to form recesses in the article or for other purposes.

According to the form of the invention at present preferred, one or both of the cooperating die members are provided with recesses adapted to removably, frictionally receive aligning inserts for cooperating with the opposed die member to align the members as they are relatively moved to molding position.

A feature of the invention resides in the novel structure of the aligning inserts which causes the die members to be aligned just prior to their mating in molding position, thereby relieving the die members and aligning inserts of excess strain and preventing distortion of the molded article.

In accordance with the concepts of the invention, it is another important object thereof to provide a mold for molding articles, having one or a plurality of article-forming cavities therein, which is inexpensive, readily manufactured to the exacting specifications necessary to produce the article of critical outline and shape and of such a rugged character it will function over long periods of time with freedom from all difficulties, requiring only the simple substitution of elements of the die members to overcome problems of wear and breakage.

Other objects, features and advantages of the invention will be apparent from the specification and claims, when considered in connection with the attached sheets of drawings, illustrating one form of the invention, wherein like characters represent like parts and in which:

FIGURE 1 is an end view of the female cavity-forming die member of FIG. 13;

FIG. 2 is a plan view of the die face of the female die member shown in FIG. 1;

FIG. 3 is a side elevational view of the female die member shown in FIG. 1;

FIG. 4 is similar to FIG. 1 without the inserts in place in the die body;

FIG. 5 is a plan view of the die member as shown in FIG. 4;

FIG. 6 is a perspective view showing the cavity defining insert;

FIG. 7 is a perspective view showing an aligning insert;

FIG. 8 is an end view of the male die member of the mold shown in FIG. 13;

FIG. 9 is a plan view of the molding face of the male die member of FIG. 8;

FIG. 10 is a side elevational view of the male die member of FIG. 8;

FIG. 11 is similar to FIG. 8 without the male die inserts in place in the die body;

FIG. 12 is an exploded perspective view of the insert for one of the recesses of the male die member;

FIG. 13 is a fragmentary plan view, partially in section, of a mold having a pair of opposed relatively movable die members embodying the concepts of the invention; and FIG. 14 is a perspective view of an article molded by the mold of FIG. 13 on a greatly enlarged scale.

Referring now to the drawings for a more detailed description of the invention, a mold or die 15 embodying the concepts of the invention is shown which includes a pair of relatively movable die members 16 and 17. The die members 16 and 17, which include respectively body members 18 and 19 providing opposed mating faces 20 and 21, are mounted in any manner known to the art for relative movement between separated and molding position, whereby a moldable material is engaged between the die faces for molding an article therefrom. While it will be understood that the invention may be embodied in substantially any mold or die wherein at least one of the relatively movable die members provides a molding cavity and the other die member cooperates therewith to mold the article, in the illustrated form of the invention the mold 15 is of the type wherein the die member 16 is a female multi-cavity die rigidly mounted in a frame 22 or the like, and the die member 17 is a male die mounted in a reciprocable support 23 for movement into and out of cooperative engagement with the female die. As shown, the body member 19 of male die member 17 is rectangular in cross-section and provided with an annular skirt 19a having a substantially cylindrical mounting portion 19b extending therefrom, whereby it is mounted in support 23. In accordance with conventional practice, the female or cavity forming die member 16 is provided with means 24 for ejecting the molded article from the molding cavity, the ejecting means being here shown as spring biased knockout pins 25 adapted to be moved by means (not shown) into the cavities to eject the articles.

The present invention is adapted for use in molds for molding articles of varying complexity of shape and size, however, it is particularly useful where the article has a critical outline and surface configuration since the concepts of the invention lend themselves to precision fabrication of the die members, thus facilitating the critical formation of the article forming cavities and cooperating molding elements. In the illustrated form of the invention, for the purpose of explanation, the mold 15 is adapted to mold semi-cylindrical articles 26 having a radius in the order of .130″ and a length in the order of .475″. The articles, which have their ends 26a, formed at a right angle to their axis, are provided with a plurality of longitudinal grooves 26b extending along their flat side 26c.

In accordance with the invention, and as shown in FIGS. 1 through 7, the female or cavity forming die member 16 has the face thereof formed with a pair of parallel elongate molding cavities 27 which extend from one end to the other of body member 18 and open outwardly of the ends thereof. While in the illustrated form of the invention a pair of molding cavities are shown, it will be understood that one or any number of cavities may be utilized within the scope of the invention. The moding cavities 27, as a result of their extending completely across the die face and opening outwardly of the ends of the body member, are readily adapted to be formed by clear-through cuts on a milling and/or grinding machine or in any other manner known to the art. A plurality of recesses or slots 28 are formed in the die face 20 and extend transversely across the molding cavities 27 to define separate article forming cavities 29 thereof. The recesses, which similar to the molding cavities, extend completely across the die face and open outwardly of the sides of the body to enable them to be formed by a milling operation or the like by clear-through cuts, are formed with smooth walls adapted to frictionally receive therein inserts or molding elements 30. The inserts 30, which extend completely across the molding cavities 27 and may or may not extend for the full length of the recesses 28, form the end walls of the article forming cavities 29 cooperating therewith to give the molded article the desired shape. By means of the inserts, the end walls of the article forming cavities may be formed perpendicular to the axis thereof with much less effort than would be required if the walls had to be cut into the cavity itself. As shown in FIG. 6, the inserts 30 are provided with transverse grooves 30a on their outer edge 30b and are chamfered at their inner end edges 30c for purposes to be hereinafter explained.

While, as has already been noted, the inserts may extend throughout the length of the recesses or from one side of the body 18 to the other, in the illustrated form of the invention the inserts are of such a length as to be positioned between slots or recesses 31 which are formed parallel molding cavities 27 adjacent edges of the die member body 18. The recesses 31, which, similar to the recesses 28 have smooth walls, are adapted to receive aligning inserts 32 for cooperating with the male die member 17 as the members are relatively moved to molding position to align the same. The aligning inserts, as shown in FIG. 7, comprise an elongate body 32a having upwardly, projecting guide portions 32b provided with inwardly inclined surfaces 32c along the outer edge thereof. The inclined surfaces 32c are adapted to make the initial contact with the body 19 of the male die member 17, as the die members are relatively moved toward each other prior to their engaging in molding position, for camming the members into aligned position. It will be understood that by aligning the members prior to their engaging in molding position the strain on the aligning inserts and the die members resulting from shifting them when they are in molding position is eliminated and distortion of the molded article is prevented. Another function of the aligning inserts, in the illustrated embodiment of the invention, is to prevent longitudinal movement of the inserts 30 when the elements are assembled so that the recessed grooves 30a will be maintained in critically predetermined position. The aligning inserts 32 have the end edges of body 32a at the side directed away from guide portions 32b, chamfered as at 32d for a purpose to be hereinafter explained.

It should at this point be noted that the sides of inserts 30 and of aligning inserts 32 are finished to a smooth surface to complement and mate with the smooth surfaces of the walls of the recesses 28 and 31, respectively. According to the concepts of the invention, the sides of the inserts and the recesses should be of such a character that when the former are inserted in the latter, air is substantially eliminated therebetween and the inserts are frictionally retained within the recesses. By frictionally retaining the inserts 30 and the aligning inserts in their respective recesses, the assembly of the die members is substantially facilitated and the members are adapted to be repaired or have elements of the molding cavity removed for replacement without dismounting the die members from the molding apparatus, by merely removing the inserts from their recesses. Removal of the inserts from the recesses is facilitated by the chamfers 30c and 32d at the inner end edges thereof, which enable a wedging tool or the like to be inserted between the insert and its recess to wedge it therefrom.

Referring now to FIGS. 8 through 12 for a more detailed description of male die member 17, it will be seen that the body portion 19 thereof is formed with two spaced parallel recesses 33 extending longitudinally across the die face 21 from one end of the body to the other. The recesses 33, which are adapted to be aligned with the molding cavities 27 of female die member 16 when the die members are in molding position and are formed with smooth walls in the same manner and for the same purpose as were the recesses in the die member 16, are adapted to receive and frictionally removably retain inserts 34 that cooperate with article forming cavities 29 to mold the molded articles and form the grooves 26b in the flat surface 26c thereof. While it will be understood that the male die inserts 34 may be formed as unitary elements or the like, in the illustrated form of the invention, as most clearly shown in FIG. 12, they comprise separate strips 34a having a spacer bar 34b of lesser height therebetween. The spacer bar 34b, in addition to positively positioning the strips, functions to complete the die face 21 between the strips.

In order to facilitate the mating of the die members 16 and 17 in molding position and the cooperative engagement of the male die inserts 34 with their respective article forming cavities 29, the inserts 30 have, as heretofore described, been formed with grooves 30a for receiving the edges of strips 34a thereby enabling the strips to enter the article forming cavities to form the grooves 26b in the molded article. While the male die inserts 34 are not here shown to be chamfered to facilitate their removal from the recesses 33, it will be understood that such chamfers may be provided as they are required.

As a result of the inventive concepts embodied in the illustrated mold 15, die members are provided which are readily adapted to be manufactured at a minimum of expense by conventional tools. As a result of the novel structure of the die members the molding cavities may be formed by simple milling procedures and thereafter the molding elements or inserts may be machined and finished to the proper size and dimension to cooperate with the molding cavities to form article forming cavities having a shape and size necessary to mold an article having a critical outline and surface configuration.

Thus, among others, the several objects and advantages of the invention as aforenoted are achieved. Obviously numerous changes in the structure may be resorted to without departing from the spirit of the invention as defined by the claims.

I claim:

1. A die member for use with a cooperating companion die to blank out of plasticizable strip stock and mold articles, said die member having a body provided with at least one longitudinal recess extending to and opening at opposite ends of the body, a pair of longitudinal grooves in the face of the die parallel with said recess, each groove being located between an adjacent edge of a recess and the adjacent end of the body and substantially coextensive with the recess, a plurality of parallel grooves in the body extending transversely across and intersecting said recess and extending to and opening at opposite sides of the body, a flat elongate metal strip fitting in and bottoming in each of said transversely extending grooves and forming with said recess a molding cavity, and other elongate strips, fitting in and bottoming one in each of said parallel grooves, adapted to engage the ends of said transverse strips and lock the latter against longitudinal movement in the grooves, said strips being immobile in the body except for removal and replacement.

2. A die member for use with a cooperating companion die to blank out of plasticizable stock and mold articles, said die member having a body provided with a plurality of spaced parallel recesses each extending to and opening at opposite ends of the body, a pair of longitudinal grooves in the face of the die parallel with said recesses, each groove being located between an adjacent recess and the adjacent end of the body and substantially coextensive with the recess, a plurality of parallel grooves in the body extending transversely across and intersecting said recesses and extending to and opening at opposite sides of the body, a flat elongate metal strip fitting in and bottoming in each of said transversely extending grooves and forming with said recesses a plurality of article-molding cavities, and other flat elongate metal strips, one fitting in and bottoming in each of said longitudinal grooves, adapted to engage the ends of said transverse strips and lock the latter against longitudinal movement in the grooves, said strips being immobile in the body except for removal and replacement.

3. A die member as defined in claim 2, in which two of said transverse grooves are located adjacent the ends of the body and a third of said transverse groove bisects the recesses, the transverse metal strip in said third groove dividing each of the parallel recesses in half whereby four article-molding cavities are produced in the die body.

4. A die member as defined in claim 2, in which the longitudinally disposed metal strips are provided with cam surfaces for cooperating with a companion die body to align the dies when they are brought together.

5. A die member as defined in claim 2, in which there are lands on the face of the die on each side of each recess and lands on the exposed faces of the transverse strips to form cutoff surfaces for engagement with cooperating cutoff surfaces on a companion die to blank material from the strip.

6. A die member for use with a cooperating die to blank out of strip stock and mold articles, said die member having a body provided with a plurality of parallel longitudinally extending slots each extending to and opening at opposite ends of the body, a plurality of thin metal strips located in each of said slots, and a spacer bar wedged between each two of said strips forcing said strips against the walls of said slot, said strips extending beyond the surface of the body and into said molding cavities and serving to mold longitudinal grooves in the article being molded.

7. A pair of cooperating die members to blank out of plasticizable material and mold articles, one of said die members having a body provided with a plurality of spaced parallel recesses each extending to and opening at opposite ends of the body, a pair of longitudinal grooves in the face of the die parallel with said recesses, each groove being located between a adjacent recess and the adjacent end of the body and substantially coextensive with the recess, a plurality of parallel grooves in the body extending transversely across and intersecting said recesses and extending to and opening at opposite sides of the body, a flat elongate metal strip fitting in and bottoming in each of said transversely extending grooves and forming with said recesses a plurality of article-molding cavities, and other flat elongate metal strips, one fitting in and bottoming in each of said longitudinal grooves, adapted to engage the ends of said transverse strips and lock the latter against longitudinal movement in the grooves, said strips being immobile in the body except for removal and replacement, the other of said die members having a body provided with a plurality of parallel longitudinally extending slots, each extending to and opening at opposite ends of the body, a plurality of pairs of thin metal strips located in each of said slots, and a spacer bar wedged between each pair of said strips forcing said strips against the lateral walls of said slot, said strips extending beyond the surface of the body and into said molding cavities and serving to mold longitudinal grooves in the article being molded, the strips of said pairs being immobile except for removal and replacement.

8. A pair of cooperating die members as defined in claim 7, in which said transverse metal strips in said first-named die member have slots to receive the longitudinal metal strips in said second die member.

References Cited in the file of this patent

UNITED STATES PATENTS

| | | |
|---|---|---|
| 2,156,459 | Muncher | May 2, 1939 |
| 2,306,732 | Huxham | Dec. 29, 1942 |
| 2,339,434 | Stehlik | Jan. 18, 1944 |
| 2,366,475 | Bartholomew | Jan. 2, 1945 |
| 2,463,269 | Haskins | Mar. 1, 1949 |
| 2,516,086 | Winterhalter | July 18, 1950 |
| 2,705,814 | Feldmann | Apr. 12, 1955 |
| 2,943,354 | Gora | July 5, 1960 |